June 30, 1970    R. J. ROBILLARD    3,517,569
CONTROL-ACTUATING DEVICE
Filed April 22, 1968
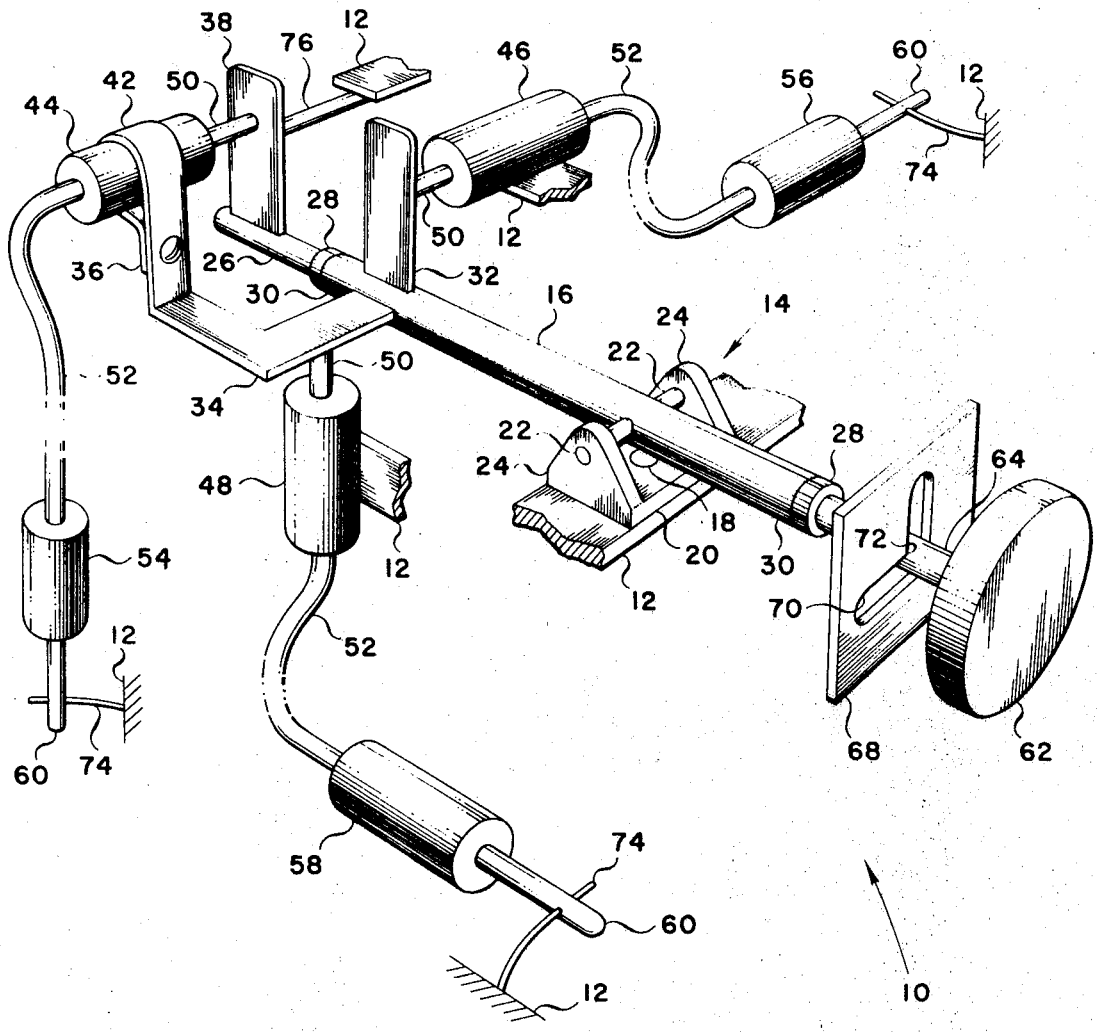
INVENTOR.
ROBERT J. ROBILLARD

United States Patent Office 3,517,569
Patented June 30, 1970

---

3,517,569
CONTROL-ACTUATING DEVICE
Robert J. Robillard, Beverly Hills, Calif., assignor to Lockheed Aircraft Corporation, Burbank, Calif.
Filed Apr. 22, 1968, Ser. No. 722,970
Int. Cl. G05g 9/00
U.S. Cl. 74—491                                    13 Claims

ABSTRACT OF THE DISCLOSURE

A control-actuating device is disclosed which utilizes a single handle or similar structure so as to actuate three different control means located within three different planes of movement. The device includes a control lever mounted on a multiplane pivot structure and a control rod pivotally mounted on the control lever. A handle or similar structure is located on the control rod so that this rod may be rotated in order to actuate one control means. By movement of the handle or similar structure in either of two different planes, the control lever will actuate the other control means used with the device.

BACKGROUND OF THE INVENTION

It is frequently desired to use a single control knob, handle or similar structure in order to actuate a plurality of different control means such as switches, valves or various mechanical structures. Various different devices for this purpose have been proposed. These prior devices are considered to be undesirable for certain applications because they are constructed in such a manner that the motion of the principal control member used in them is not effectively coordinated with the various control functions to be achieved through use of the control means used with these devices.

To a degree this can be illustrated by reference to a presently intended application of the herein described invention in the aircraft field. In aircraft certain seats, such as a pilot's seat, are normally constructed so as to be capable of being moved horizontally and vertically and so as to be tilted or pivoted between different positions. In the past, different separate control means have been used in order to control or permit each of these different types of movement because there was no known control device which would control these different types of movement in such a way as to coordinate the movement with the actuation of the control device. In other words, there was no control device which when moved in the vertical plane would permit up and down movement of a seat and which when actuated in a horizontal plane would permit forward and backward movement of the seat and which when rotated would permit tilting or pivoting of the seat.

As result of the absence of such device, it has been conventional to utilize as seat controls on certain seats such as the pilot's seat in an aircraft a plurality of different controls or control devices, each of which correspond to one type of movement of the seat. This is disadvantageous for several different reasons. It is a matter of common knowledge that cockpits in many types of aircraft are extremely crowded and that as a result of this there is only room for a limited number of controls in such areas, patricularly within easily-accessible regions in such areas. This has necessitated the seat controls in certain types of aircraft being located within various comparatively inaccessible areas where they cannot be used conveniently by an individual sitting in a seat. Further, such an individual is handicapped in utilizing such individual controls when they are in such a location because he or she must remember specifically which of them permits each type of seat movement.

SUMMARY OF THE INVENTION

An object of the present invention is to provide new and improved control-actuating devices utilizing a single handle or similar structure which can be used in aircraft so as to operate different control means to permit the movement of an aircraft seat in different planes. It is not to be assumed that the control devices of the present invention are limited to only this particular use or utility. A broader objective of the present invention is to provide control-actuating devices which can be utilized whenever it is desired to actuate or operate a plurality of different control means utilizing a single control knob, handle, or similar structure.

Another object of this invention is to provide control-actuating devices which can be constructed and utilized so that as these devices are operated by being moved or actuated in different planes, different control means corresponding to each of these planes are actuated. A further object of this invention is to provide control-actuating devices which are relatively simple, relatively inexpensive to construct; easily and conveniently utilized; and capable of giving prolonged effective service.

In accordance with this invention these objectives are achieved by providing control-actuating devices, each of which includes a control lever mounted on a pivot means permitting the control lever to be rotated in at least first and second different planes and a control rod rotatably mounted on the control lever. With a structure of this type when the rod is rotated about its axis the lever is not moved. However, the lever may be rotated as permitted by the pivot means upon movement of the control rod so as to cause other than rotational movement of this control rod about the axis. In an actuating device of this invention a handle, knob or similar structure is attached to the control rod so as to permit the various types of movement of this rod described in order to permit both the rod and the control lever to be moved so as to actuate different, separate control means.

BRIEF DESCRIPTION OF THE DRAWING

The aforegoing and various other related objectives and advantages of this invention will be apparent from a detailed consideration of the accompanying drawing in which:

The single figure is a perspective view illustrating a presently preferred embodiment or form of a control actuating device of this invention; and It will be realized from a consideration of the drawing and of this specification that the principles of the invention embodied in the device shown in the drawing can be embodied within other differently appearing and differently constructed devices through the use or exercise of routine engineering skill.

DESCRIPTION OF THE PREFERRED EMBODIMENT

In the figure there is shown a control-actuating device 10 of the present invention mounted upon an appropriate support 12 such as a framework located beneath an aircraft seat. This device 10 includes what may be referred to as a universal joint or multiplane pivot structure 14 carrying a control lever 16 so that this lever 16 is supported upon the support 12 in such a way that it can be rotated in either a vertical or a horizontal plane. The particular pivot structure 14 used for this purpose in the device 10 includes a pivot pin 18 connecting the support 12 to a bracket 20 and a set of pivot pins 22 connecting the lever 16 to upstanding ends 24 on the bracket 20. It will be understood however that other equivalent pivot structures may be substituted for the structure 14.

In the device 10 the lever 16 is an elongated cylindrical tubular member. A control rod 26 projects through the interior of the lever 16 so as to extend from both of its ends. The rod 26 is cylindrical and fits within the lever 16 so as to be rotatably mounted within it. Because of this mounting the rod 26 can be rotated about its axis in a different direction from the two directions in which the lever 16 may be moved about the pivot structure 14. Conventional shaft collars 28 are located on the rod 26 so as to engage the ends 30 of the lever 16 in order to prevent axial movement of the rod 26 with respect to the lever 16.

Adjacent to one of the ends 30 the lever 16 carries a normally vertically-disposed actuator 32. In an adjacent location the lever 16 also carries a normally horizontally-disposed actuator 34 having an upstanding end 36. This end 36 is located adjacent to but is spaced from a normally vertically-disposed actuator 38 on an end 40 of the rod 26. By a bracket 42 a hydraulic control member 44 is disposed on the actuator 34 adjacent to the actuator 38. Other similar control members 46 and 48 are mounted on the support 12 adjacent to the actuators 32 and 34 respectively. Each of these control members includes a plunger 50 which extends from it. The plunger 50 extending from the control member 44 normally just engages the actuator 38. The plunger 50 from the control member 46 normally just engages the actuator 32 and the plunger 50 from the control member 48 normally just engages the actuator 34.

The specific control members 44, 46 and 48 shown are all identical construction; these control members are connected by flexible hoses 52 to other identical control members 54, 56 and 58 from each of which there extends a plunger 60 corresponding to a plunger 50 previously described. The various control members 44, 46 and 48 and 54, 56 and 58 are of the conventional commercial construction. The interiors of these control members and the hoses 52 contain a conventional hydraulic fluid.

In these control members each of the plungers 50 and 60 serves essentially as a piston so that when the plunger in one of the control members is pushed towards this member the plunger in another connected control member is moved away from it and vice versa. Thus, when the plunger 50 extending from the control member 44 is moved towards this control member, the plunger 60 on the corresponding connected control member 54 is moved outwardly. Similarly when the plunger 60 of this member 54 is moved towards it, the plunger 50 on the member 44 is moved outwardly from the member 44. The other "sets" of control members 46 and 56 and 48 and 58 operate in the same manner.

With the device 10 an enlarged knob 62 or handle is located upon an end 64 of the control rod 26 remote from the end 40 of this rod. When this knob 62 is moved vertically the motion is transferred to the lever 16 causing the actuator 34 to move against the plunger 50 extending from the control member 48. This in turn moves the plunger 60 extending from the control member 58 outwardly so as to accomplish a control function as, for example, by the moved plunger 60 engaging an appropriate lock mechanism of a conventional type so as to permit an aircraft seat to be moved vertically.

Similarly when the knob 62 is moved horizontally the actuator 32 will engage the control member 46 so that the plunger 50 within this control member 46 is pushed inwardly, causing the plunger 60 in the connected control member 56 to be pushed outwardly. This in turn can be used to accomplish another control function as, for example, by the moved plunger 60 engaging a different, appropriate lock mechanism permitting an aircraft seat to be moved horizontally.

In order to insure that such motion is in only a single direction, that is either vertically or horizontally, and not at a diagonal with respect to the vertical or horizontal, it is preferred to use with the invention a guideplate 68 attached to the support 12. This guideplate includes an L-shaped slot 70 corresponding to vertical and horizontal motion; this slot 70 is located so that the control rod 26 and, if desired, the lever 16 extend through it.

In a normal position the control rod 26 is in apex 72 of this slot 70. In this position the lever 16 and the control rod 26 extend horizontally. In order to provide for an automatic return of the lever 16 to such a horizontal position it is possible to utilize springs 74 which contact the plungers 60 on the control members 46 and 48 so as to bias these plungers inwardly to a point where the corresponding plungers 50 bear against the actuators 32 and 34 so as to hold the rod 26 in the apex 72. A similar spring 74 is preferably used in conjunction with the plunger 60 on the control member 54 so that the plunger 50 on the corresponding control member 44 is biased outwardly to a sufficient extent so that the actuator 32 is held vertically. If desired an appropriate stop 76 may be located so as to be attached to the support 12 in order to prevent the actuator 38 from being rotated past this position. The springs 74 may be simple wires attached to a support 12 and extending through holes in the plungers 60.

During use of the device 10 the knob 62 is rotated so as to turn the actuator 38 against the control member 44 pushing the plunger 50 within this control member inwardly so as to cause the plunger 60 connected to the control member 54 to move outwardly. This in turn is used to accomplish another control function as, for example, by this plunger 60 moved engaging an appropriate lock mechanism of the conventional type so as to permit the seat of an aircraft seat to be rotated.

The device 10 may of course be utilized for other purposes than controlling the operation of locking mechanisms on aircraft seats. Because this device permits three different movements in different directions to be utilized for different separate control functions, it may be employed wherever it is desired to accomplish actuation of three different controls through the use of a single control member. In adapting the device 10 for use in other applications than the precise application herein described, it is only necessary to utilize routine engineering skill in modifying this device.

A number of such modifications will be readily apparent to those skilled in mechanical control devices. As example of such modification, the universal joint or multiplane pivot structure 14 can be replaced with a conventional ball and socket joint, although this is not normally preferred because of economic consideration. Similarly, the control members 44, 46 and 48 may be any type of control members which may be actuated by movement of the actuators 32, 34 and 38 or even the lever 16 or the control rod 26. For this reason the control members 44, 46 and 48 may be considered as, or designated as, control means. Various different control means such as switches, Boden cables and the like may be substituted for them.

In a similar manner the springs 74 may be replaced by differently positioned and differently operating springs which will accomplish the same function as the springs 74. These springs 74 serve to return the entire device 10 to an initial position after it has been employed. For this reason the springs 74 or any such equivalent members may be considered as means for returning the actuators 32, 34 and 38, the lever 16 and the control rod 26, and the entire device 10 to an initial configuration or position.

I claim:
1. A control actuating device comprising:
   a rotatable control rod having first and second ends,
   a tubular control lever disposed concentrically about and intermediate the ends of said control rod, a universal joint connected to said control lever exteriorly and intermediate the ends thereof and adapted to restrict said control lever and said control rod to concurrent movement in either of two perpendicular planes, first actuating means extending radially from the first end of said control rod, second actuating means extending radially from said control lever adjacent said first actuating means, first control means disposed adjacent said first actuating means and adapted to be directly actuated thereby in response to rotational movement of said control rod about its longitudinal axis, and second control means disposed adjacent said second actuating means and normal to planes through the actuating means and the longitudinal axis of said control lever, said second control means adapted to be actuated by said second actuating means in response to movement of the second end of said control rod away from said second control means.

2. A control-actuating device as claimed in claim 1 including:

spring means for returning said control rod and said control lever to an initial position of said control rod and said control lever.

3. A control-actuating device as claimed in claim 1 including:

guideplate means for limiting movement of said control lever to rotation only within perpendicular planes.

4. A control-actuating device as claimed in claim 1 including:

knob means secured to said control rod for rotating said control rod and concurrently moving said lever and rod.

5. A control-actuating device as claimed in claim 1 wherein:

said universal joint means is a multiplane pivot joint means, said control-actuating device also including:

guideplate means for limiting movement of said control lever to movement only within said different planes, knob means secured to said control rod, said control rod being capable of being rotated with respect to said control lever by rotation of said knob means, said control lever being capable of being moved within said different planes by movement of said knob means within said different planes.

6. A control-actuating device as claimed in claim 5 wherein:

said control rod and said control lever have adjacent ends, said knob means is located on one end of said control rod, said control means are located adjacent to the ends of said control rod and said control lever remote from said knob means.

7. A control-actuating device as claimed in claim 1 wherein:

said universal joint is a multiplane pivot joint means, said control lever is a tube and said control rod is rotatably held within said tube, said tube being capable of being moved in said different planes through movement of said rod, said control-actuating device also including:

guideplate means for limiting movement of said control lever to movement only within said different planes, knob means secured to said control rod for rotating said control rod and said control lever, spring means for returning said control rod and said control lever to an initial position of said control rod and said control lever, an actuating means located on an end of said control rod, said actuatig means corresponding to the one of said control means located adjacent to said control rod, other actuating means located on said control lever, each of said other actuating means corresponding to one of the other of said control means located adjacent to said control lever, each of said actuating means being capable of contacting the control means corresponding to it so as to actuate such control means.

8. A control actuating device in accordance with claim 1 wherein said second actuating means are disposed in planes perpendicular to each other.

9. A control actuating device in accordance with claim 8 wherein said second actuating means are disposed in vertical and horizontal planes respectively and said second control means are disposed in complementary perpendicular relationship to their complementary actuating means.

10. A control actuating device in accordance with claim 9 wherein said vertically mounted second control means is actuated by said horizontally mounted second actuating means in response to vertical movement of the second end of said control rod.

11. A control actuating device in accordance with claim 1 wherein said first control means is mounted on said second actuating means.

12. A control actuating device in accordance with claim 1 wherein said first actuating means comprises a radially extending integral member which is rigidly secured to said rod, said member directly actuating said control means in response to its arcuate motion upon rotation of said control rod about its longitudinal axis.

13. A control actuating device comprising:

a rotatable control rod having first and second ends, a tubular control lever disposed concentrically about and intermediate the ends of said control rod for rotatably supporting said rod, a universal joint adapted to rotate in either of two perpendicular planes, said joint exteriorly mounted to said lever intermediate its ends for supporting said lever and said rod while allowing concurrent movement thereof in either of said planes, a first integral members extending radially from the first end of said control rod, a first control means in juxtaposition to said integral member and adapted to be directly actuated by said integral member in response to rotational movement of said control rod about its longitudinal axis, a plurality of secondary integral members extending radially from said control lever adjacent said first integral member, said secondary integral members being disposed in substantially perpendicular planes, and a plurality of secondary control means disposed adjacent said secondary integral members and adapted to be directly actuated by said secondary integral members in response to movement of the second end of said control rod away from said secondary control means.

References Cited

UNITED STATES PATENTS

| | | | |
|---|---|---|---|
| 3,103,127 | 9/1963 | Hartop | 74—471 |
| 3,266,523 | 8/1966 | Stevens | 74—471 X |
| 3,321,990 | 5/1967 | Densmore | 74—471 |

MILTON KAUFMAN, Primary Examiner